(12) United States Patent
Godier et al.

(10) Patent No.: US 11,431,707 B2
(45) Date of Patent: Aug. 30, 2022

(54) METHOD, DEVICE AND SERVER FOR THE SECURE DISTRIBUTION OF A CONFIGURATION TO A TERMINAL

(71) Applicant: ORANGE, Issy-les-Moulineaux (FR)

(72) Inventors: Julien Godier, Chatillon (FR); Matthias Hamel, Chatillon (FR); Alexandre Ferrieux, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 361 days.

(21) Appl. No.: 16/448,613

(22) Filed: Jun. 21, 2019

(65) Prior Publication Data

US 2019/0394200 A1 Dec. 26, 2019

(30) Foreign Application Priority Data

Jun. 22, 2018 (FR) ...................................... 1855606

(51) Int. Cl.
*H04L 9/40* (2022.01)
*H04L 9/08* (2006.01)
(Continued)

(52) U.S. Cl.
CPC ........ *H04L 63/0876* (2013.01); *H04L 9/0866* (2013.01); *H04L 9/30* (2013.01);
(Continued)

(58) Field of Classification Search
CPC ............. H04L 63/0428; H04L 63/0272; H04L 63/0823; H04L 63/04; H04L 63/0281;
(Continued)

(56) References Cited

U.S. PATENT DOCUMENTS

| | | | | |
|---|---|---|---|---|
| 10,390,223 | B2* | 8/2019 | Nakajima | ............. H04W 12/06 |
| 2009/0125633 | A1* | 5/2009 | Watsen | ................... H04L 69/16 |
| | | | | 709/229 |

(Continued)

OTHER PUBLICATIONS

French Search Report and Written Opinion dated Jan. 23, 2019 for corresponding French Application No. 1855606, filed Jun. 22, 2018.

(Continued)

*Primary Examiner* — Tae K Kim
(74) *Attorney, Agent, or Firm* — David D. Brush; Westman, Champlin & Koehler, P.A.

(57) ABSTRACT

Distributing a configuration to a first terminal, including establishing, on initiative of the first terminal, a connection between the first terminal and a server, which is configured to redirect connection requests received by the server on a communication port to the first terminal. The communication port is derived from an identifier of the first terminal received in a message establishing the connection. When the identifier of the terminal is associated with a plurality of terminals, the method includes generating and storing control data in association with the identifier of the terminal, transmitting, via the connection, a control message to the first terminal, which includes the control data, receiving, from a second terminal, a confirmation message including the control data and an identifier of the second terminal, and when the second terminal is a trusted terminal, and transmitting customized parameters to the first terminal to access the server.

14 Claims, 3 Drawing Sheets

(51) Int. Cl.
  *H04L 9/30* (2006.01)
  *H04L 9/32* (2006.01)
  *H04L 41/08* (2022.01)
  *H04L 67/10* (2022.01)
  *H04L 67/141* (2022.01)

(52) U.S. Cl.
  CPC .............. *H04L 9/321* (2013.01); *H04L 41/08* (2013.01); *H04L 67/10* (2013.01); *H04L 67/141* (2013.01)

(58) Field of Classification Search
  CPC ....... H04L 63/08; H04L 63/20; H04L 63/029; H04L 67/34; H04L 67/02; H04L 9/006; H04L 63/0876; H04L 9/0866
  See application file for complete search history.

(56) References Cited

U.S. PATENT DOCUMENTS

| | | | | |
|---|---|---|---|---|
| 2013/0110728 | A1* | 5/2013 | Kobres | H04L 9/3247 705/75 |
| 2014/0075515 | A1* | 3/2014 | McColgan | H04W 12/069 726/4 |
| 2014/0162600 | A1* | 6/2014 | Chang | H04W 12/37 455/411 |
| 2014/0222955 | A1* | 8/2014 | Islam | G06F 21/31 709/217 |
| 2014/0317713 | A1 | 10/2014 | Gadotti | |
| 2015/0295890 | A1* | 10/2015 | Qin | H04L 65/1073 726/11 |
| 2016/0021098 | A1* | 1/2016 | Dhanabalan | H04W 12/08 726/8 |
| 2016/0219017 | A1* | 7/2016 | Kolhi | H04L 61/2015 |
| 2017/0048242 | A1* | 2/2017 | Marquardt | H04L 45/66 |
| 2017/0053136 | A1* | 2/2017 | Kadavan | H04L 67/1063 |
| 2017/0230333 | A1* | 8/2017 | Glazemakers | H04L 47/70 |
| 2018/0092011 | A1* | 3/2018 | Lin | H04W 36/14 |
| 2018/0227128 | A1* | 8/2018 | Church | H04L 63/0853 |
| 2019/0207920 | A1* | 7/2019 | Holmelin | H04L 63/08 |
| 2019/0215327 | A1* | 7/2019 | Murthy | H04L 63/0236 |
| 2019/0268423 | A1* | 8/2019 | Shah | H04L 67/2838 |
| 2020/0076860 | A1* | 3/2020 | Motukuru | H04L 63/102 |

OTHER PUBLICATIONS

English translation of the French Written Opinion dated Jan. 23, 2019 for corresponding French Application No. 1855606, filed Jun. 22, 2018.

\* cited by examiner

METHOD, DEVICE AND SERVER FOR THE SECURE DISTRIBUTION OF A CONFIGURATION TO A TERMINAL

TECHNICAL FIELD

The invention belongs to the field of telecommunications, and relates more particularly to a method for distributing authentication elements to equipment from a server.

PRIOR ART

To allow private and secure connections over the Internet, it is common to implement virtual private network (VPN) solutions. VPNs allow access to remote computers or equipment in the same way as if they were on a local area network. Communications through a VPN are generally encrypted and authenticated.

Two main techniques are known for creating a VPN.

A first technique involves setting up an IPSec tunnel using client software installed on the equipment in question. The authentication elements may be of different kinds (shared keys, X.509 certificates). The control of the distribution of these certificates is based either on manual procedures or on a pre-existing authentication system such as Active Directory technology from Microsoft™. The authentication may relate to the system and/or the user who is connecting.

A second technique, VPN SSL, does not require client software to be installed and may be implemented using a simple Internet browser. The authentication elements do not in general make it possible to authenticate the terminal that is connecting: the authentication relates to the user who is connecting and not the system. If the authentication of the terminal is implemented, it is based on a distribution of keys or certificates performed either manually or based on a pre-existing authentication system.

VPNs are used for example to connect remotely to equipment situated in a private network, for example within a business local area network. Such equipment is for example network probes deployed by a maintenance company in business networks. The maintenance company may then use a VPN connection to remotely access a particular probe and obtain information about the quality of service within the business network.

For production cost reasons, such probes may initially be configured identically when leaving the factory. For example, they share a generic identifier and a private and public key pair that is shared by all of the probes.

To guarantee security, each probe must however be configured in a customized manner when it is activated in a local area network. Customizing a probe comprises at least the assignment of a unique identifier and of a unique private key/public key pair for this probe.

Conventionally, configuring such a probe requires physical access to the probe in order to configure a private/public key set thereon. One of the main difficulties consists in distributing the authentication elements for encrypting VPN communications.

It is not always possible to easily access the probe in order to configure a set of keys thereon, in particular when a large number of probes are deployed with various clients. There is therefore a need for a method for securely configuring such a remote device. In particular, the configuration should be transmitted securely to the equipment, that is to say without it being able to be intercepted by a third party, while being certain of the identity of the equipment to which the key is distributed.

SUMMARY OF THE INVENTION

To this end, what is proposed is a method for distributing, by way of a server, a configuration intended for at least a first terminal, the method comprising establishing, on the initiative of the first terminal, a connection between the first terminal and the server, the connection being configured so as to redirect at least one connection request received by the server on a communication port to the first terminal, the method such that the number of the communication port is derived from an identifier of the first terminal that is received in a message establishing the connection, and such that, when the identifier of the terminal is an identifier associated with a plurality of terminals, the method includes the following steps:

Generating and storing an item of control data in association with the identifier of the terminal, Transmitting, via the established connection, a control message to the first terminal, the message comprising at least the generated item of control data, Receiving, from a second terminal, a confirmation message comprising said item of control data and an identifier of the second terminal, Determining that the identifier of the second terminal is an identifier of a trusted terminal, and When the second terminal is determined to be a trusted terminal:

Configuring customized parameters for the first terminal to access the server and transmitting the customized parameters to the first terminal.

The terminal to be configured connects to the server using a default configuration, shared by a plurality of terminals of the same type. As the initial configuration of the terminals to be configured is identical, the server is not able to ensure that a terminal that connects is eligible to receive a customized configuration. The method overcomes this problem by transmitting an item of control data to the terminal by way of a first connection initiated by the terminal. When the server receives the item of control data by way of a second communication network, and when this item of data originates from a terminal determined as being a trusted terminal, the eligibility of the terminal to receive a configuration is confirmed. The server may then determine and transmit customized configuration parameters to the terminal.

The identifier of the terminal is also an identifier comprising a communication port number on the server, or an identifier from which it is possible to derive a communication port number. As the identifier is transmitted in a connection establishment message, the server is able to obtain the port number requested by the terminal before accepting establishment of the connection. The server may thus deny establishment of a connection when the communication port number derived from the identifier of the terminal is already assigned to another terminal currently being configured.

The combination of these two features allows the server to unambiguously recover a connection associated with a received item of control data. Specifically, such a provision makes it possible to guarantee that just one connection between a terminal whose configuration is not customized and the server is able to be established at a given time.

According to one particular implementation, the method is such that the step of configuring and transmitting customized access parameters for the first terminal to access the server comprises the following sub-steps:

Obtaining a terminal identifier stored in association with the item of control data, Generating and transmitting a second identifier of the terminal to the terminal corresponding to the obtained identifier, the second identifier comprising a communication port number different from the communication port number derived from the first identifier, Receiving, from the terminal, an authentication key generated by the terminal in response to the reception of the second identifier, and Associating said received public key with at least authorization to access the server.

Thus, when the eligibility of the terminal to obtain a customized configuration is confirmed, the server assigns a new identifier to the terminal. As this new identifier is different from the first identifier the terminal, the server is able to accept the future connections originating from this terminal without it being necessary to verify the legitimacy thereof by sending an item of control data. Secondly, the new assigned identifier comprises a communication port number different from the port number contained in or derived from the first identifier. In this way, the terminal is able to connect even if another terminal is connected with the first identifier in order to obtain a customized configuration.

In response to the transmission of the new identifier of the terminal by the server, the terminal transmits an authentication key, for example a public key generated by the terminal, to the server. The server is then able to associate access rights with the authentication key so as to authorize future connections originating from the terminal.

According to one particular embodiment, the method is such that the establishment, on the initiative of the first terminal, of a connection between the first terminal and the server comprises the following steps:

Receiving a command to establish a first secure connection originating from the first terminal, called carrier connection, the command comprising an identifier of the first terminal, Deriving a communication port number from the received identifier of the terminal, Establishing a second secure connection between the server and the first terminal, the second connection being carried by the first connection and configured so as to redirect incoming connections on said derived communication port number to the terminal.

A first connection is established on the initiative of the terminal using an identifier and a default authentication key contained in its initial configuration. The fact that the connection is initiated by the terminal makes it possible to establish a connection with the server without it being blocked by a firewall at the exit of the network to which the terminal belongs. The server then establishes a new connection carried by the first connection. As this new connection is carried by the first connection, it is able to be established by the server without being blocked by a firewall protecting the network of the terminal.

As the incoming connections on the communication port of the server derived from the identifier of the terminal are redirected to the terminal, the method allows the terminal to be accessed from a remote workstation without access being blocked by a firewall protecting the network of the terminal.

According to one particular implementation, the method is such that the establishment of a connection originating from the first terminal is denied when a connection is already established with a terminal having the same terminal identifier as the first terminal.

Such a provision makes it possible to ensure that just one terminal is able to receive a configuration at a given time. As the terminals are initially identical, authorizing just one configuration at a given time makes it possible to guarantee that a customized configuration will be distributed only to an authorized terminal.

According to another aspect, and corresponding to the method for distributing a configuration, the invention also relates to a method for receiving, by way of a terminal, a configuration distributed by a server, the terminal being connected to a first communication network, the method comprising establishing, on the initiative of the terminal, a connection between the terminal and the server, the connection being configured so as to redirect connection requests received by the server on a communication port to the terminal. Such a method is noteworthy in that the number of the communication port is derived from an identifier of the terminal transmitted by the terminal in a message establishing the connection, and in that, when the identifier of the terminal is an identifier associated with a plurality of terminals, the method includes the following steps:

receiving, from the server, a control message comprising at least one item of control data generated by the server, transmitting said item of control data to a second terminal, said second terminal being configured so as to transmit the item of control data and an identifier of the second terminal to the server by way of an access network different from the first communication network, and receiving customized configuration parameters from the server, and configuring the terminal on the basis of the received parameters.

The method for receiving a configuration thus allows a terminal having a non-customized configuration to securely receive a customized configuration. By proposing to transmit a communication port number in an identifier of the terminal, the method makes it possible to communicate this communication port number to the server without a connection being established. The server may thus decide to deny establishment of the connection if another terminal is already currently being configured. Transmitting the item of control data to a terminal deemed to be a trusted terminal allows the server to identify the terminal from among a plurality of terminals having one and the same configuration.

The combination of these two features allows the server to unambiguously recover a connection associated with a received item of control data. Specifically, such a provision makes it possible to guarantee that just one connection between a terminal whose configuration is not customized and the server is able to be established at a given time, and allows the server to determine the terminal to which the item of control data received by way of the trusted terminal relates.

According to one particular embodiment, the method is such that the step of receiving parameters and of configuring the terminal comprises the following sub-steps:

Receiving a second identifier of the terminal from the server,

Generating at least one authentication key associated with the second identifier, Transmitting the at least one generated key to the server, and Storing the second identifier of the terminal and the at least one generated authentication key.

When a customized identifier is received by the terminal from the server for distributing a configuration, an authentication key is generated. This is for example a password or a private/public key pair. In this case, only the public key is transmitted to the server, the private key remaining known only to the terminal. The new identifier and the key are stored by the terminal such that the terminal is able to use them in subsequent connections.

According to one particular implementation, the method for receiving a configuration is such that the step of establishing a connection between the terminal and the server comprises the following sub-steps:
- sending a command to establish a first secure connection to the server, called carrier connection, the command comprising a first identifier of the device obtained from an initial configuration of the device, the identifier of the device comprising a port number, and
- receiving, through the carrier connection established with the server, a command to establish a second secure connection, the connection being configured by the server so as to redirect incoming connections on said port number of the server to the device to the device through the carried connection.

The method thus makes it possible to access the terminal from a workstation outside the network to which the terminal belongs, even if this network is protected by a firewall. To this end, a first connection is established on the initiative of the terminal, such a connection establishment being authorized by a firewall. The server then establishes a second connection to the terminal, this second connection being carried by the first connection. As a communication port is configured so as to redirect incoming connections on this port to the terminal, it is possible to establish connections to this terminal.

In one particular embodiment, the method for receiving a configuration is such that it furthermore comprises, upon detection of a denial to establish the first connection, triggering a countdown timer at the expiry of which a new connection attempt is made.

The method thus allows the terminal to renew a connection attempt at regular intervals until the server is available to take over the configuration of the terminal.

According to one particular embodiment, the method for receiving a configuration is such that a new connection attempt following a denial to establish a connection by the server comprises transmitting a connection establishment message comprising an identifier of the terminal, the identifier comprising a port number different from the port number contained in the first identifier of the device.

The terminal, in its initial configuration, has at least two communication ports that it is able to select in order to construct an identifier. In this way, in the event of a connection denial by the server, for example because a first terminal that has used a first communication port in its identifier is currently being configured, the terminal is able to generate a new identifier comprising a second communication port different from the first communication port used in the first unsuccessful attempt.

According to one particular embodiment, the method for receiving a configuration is such that the step of transmitting the item of control data to a terminal different from the device comprises a step of displaying the item of control data on a screen of the device.

The received item of control data is displayed on a screen of the terminal so as to be transmitted to a second terminal deemed to be a trusted terminal. For example, the item of control data may be displayed in alphanumeric form so as to be copied over by a user onto the second terminal. It may also be displayed in the form of a barcode or of a two-dimensional graphic code so as to be decoded using a suitable reader on the second terminal. In this way, the item of control data is able to be transmitted to a terminal that does not form part of the network to which the terminal belongs.

According to another aspect, the invention also relates to a device for distributing a configuration to at least a first terminal, the device comprising means for establishing a connection with a first terminal on the initiative of said first terminal, the connection being configured so as to redirect connection requests received by the server on a communication port to the first terminal, the device being such that it includes:
- means for deriving a number of said communication port from an identifier of the first terminal received in a message establishing the connection,
- means for verifying that the identifier of the first terminal is an identifier corresponding to an initial configuration of the terminal,
- means for generating and storing an item of control data in association with the identifier of the terminal,
- a communication module designed to transmit, via the established connection, a control message to the first terminal, the message comprising at least the generated item of control data,
- the communication module furthermore being designed to receive, from a second terminal, a confirmation message comprising said item of control data and an identifier of the second terminal,
- means for determining that the identifier of the second terminal is an identifier of a trusted terminal, and
- When the second terminal is determined to be a trusted terminal:
    - a configuration module designed to configure customized parameters for the first terminal to access the server and transmit customized parameters to the first terminal.

Correspondingly, the invention also relates to a device able to be configured by a server, the device being connected to a first communication network and comprising communication means designed to establish a connection to the server, the connection being configured so as to redirect connection requests received by the server on a communication port to the device, the device being such that the communication means are furthermore configured so as to:
- transmit, in a message establishing the connection, an identifier of the device comprising said communication port number,
- receive, from the server, a control message comprising at least one item of control data generated by the server,
- transmit said item of control data to a second terminal, said second terminal being configured so as to transmit the item of control data and an identifier of the second terminal to the server by way of an access network different from the first communication network, and
- receive customized configuration parameters from the server, and The device furthermore comprising means for updating its configuration on the basis of the received parameters.

The invention also relates to a server including a device for distributing a configuration as described above and to a terminal including a device for receiving a configuration as described above.

The devices, server and terminals described above have at least advantages analogous to those of the methods to which they relate.

In one particular embodiment, the various steps of the methods for distributing a configuration and for receiving a configuration are determined by computer program instructions.

The invention therefore also targets a computer program including instructions designed to implement the steps of the method for distributing a configuration and/or instructions designed to implement the steps of the method for receiving a configuration as described above when the program is executed by a processor.

This program may use any programming language, and be in the form of source code, object code, or of intermediate code between source code and object code, such as in a partially compiled form, or in any other desirable form.

The invention also targets a recording medium able to be read by a processor and on which there is recorded a computer program including instructions designed to implement the steps of the method for distributing a configuration and/or instructions designed to implement the steps of the method for receiving a configuration as described above when the program is executed by a processor.

The information medium may be any entity or device capable of storing the program. For example, the medium may include a storage means, such as a ROM, for example a CD-ROM or a microelectronic circuit ROM, a flash memory, or else a magnetic recording means, for example a floppy disk or a hard disk.

Moreover, the information medium may be a transmissible medium such as an electrical or optical signal, which may be routed via an electrical or optical cable, by radio or by other means. The program according to the invention may in particular be downloaded from an Internet network.

As an alternative, the information medium may be an integrated circuit in which the program is incorporated, the circuit being designed to execute or to be used in the execution of the method in question.

The various aforementioned embodiments or implementation features may be added, independently or in combination with one another, to the steps of the methods for distributing and for receiving a configuration.

BRIEF DESCRIPTION OF THE FIGURES

Other features and advantages of the methods will become more clearly apparent from reading the following description of one particular embodiment, given by way of simple illustrative and nonlimiting example, and the appended drawings, in which.

DETAILED DESCRIPTION

Figure 1:
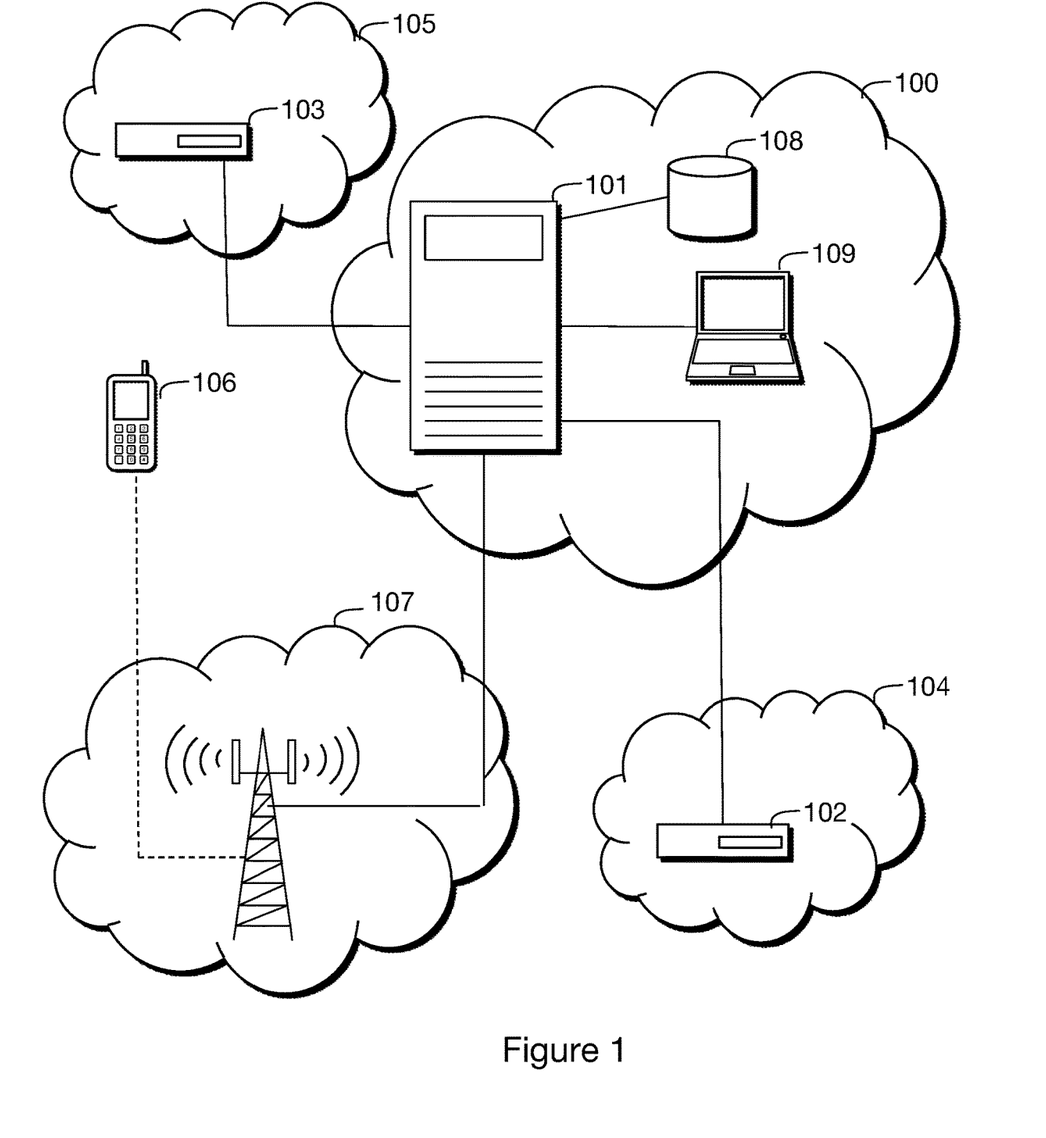
FIG. 1 shows an architecture suitable for implementing the configuration and configuration distribution methods according to one particular embodiment.

FIG. 1 shows a telecommunications network 100 comprising a server 101 able to communicate with a database 108 and a terminal 109, for example a portable computer.

The figure also shows two equipments 102 and 103 respectively belonging to networks 104 and 105. The equipments 102 and 103 that are shown are probes that are installed in business local area networks 104 and 105. These networks have a private addressing plan and are linked to the network 100 by interconnection gateways that are not shown in the figure. An interconnection gateway is in particular known for performing an NAT (network address translation) function and/or a firewall function. Due to this, the connections between the probe 103 and the server 101 or the computer 109 are able to be established only on the initiative of the probe 103, the connections to the probe 103 from the server 101 or the computer 109 being blocked by the gateway.

The figure also shows a cellular access network 107 interconnected with the network 100 and a mobile terminal 106 connected to the access network 107. The telephone 106 may be a smartphone, a tablet or any other device different from the probes 102 and 103 and designed to establish communications with an equipment of the network 100 by way of a network such as the cellular access network 107. The terminal 106 may in particular transmit messages to the server 101, directly or by way of other technical equipment, not shown.

The terminal 106 is a trusted terminal whose call number is recorded in the database 108. In this way, when a message originating from the access network 107 is received by the server 101, the server 101 obtains an identifier of the calling terminal from the message and is able to consult the database 108 to determine whether or not the message originates from a trusted terminal. In this way, the server is able to make the execution of certain actions following the reception of a message from the network 107 conditional on the fact that the message originates from a trusted terminal.

The probes 102 and 103 comprise a communication interface allowing them to exchange messages with other equipment. This is for example an Ethernet or Wi-Fi network interface.

This first network interface allows the equipment 102 and 103 to establish connections with the server 101.

In their initial state, the probes 102 and 103 have an identical configuration. The configuration of a probe comprises at least:
  an identifier of the probe,
  an address for establishing connections to the server 101,
  a user account U1, and
  a public key KPU1/private key (KPR1) pair associated with the user account, and
  a public key KPU2 associated with authorizations to access an account U2 on the server 101, the identifier of the account U2 of the server being able to be derived from the identifier of the probe (for example, the user name of the account U2 on the server is identical to the identifier of the probe).

Remote connection rights to the user account are associated with the public key. Thus, for example, the key KPR1 allows an SSH (secure shell) connection to the account U1 initially configured in the probes 102 and 103.

The probes 102 and 103 are thus able to establish secure connections with the server 101 using the account U2 and the key KPU2.

Of course, such an architecture may comprise more than two devices 102 and 103, which then initially share the same configuration.

When a probe 102 and 103 is installed in a business network, the initial configuration of the probe has to be customized in order to guarantee security. Specifically, as all of the probes are preconfigured identically when leaving the factory, malicious parties could use the configuration of a probe to access another identical probe without authorization.

Figure 2:
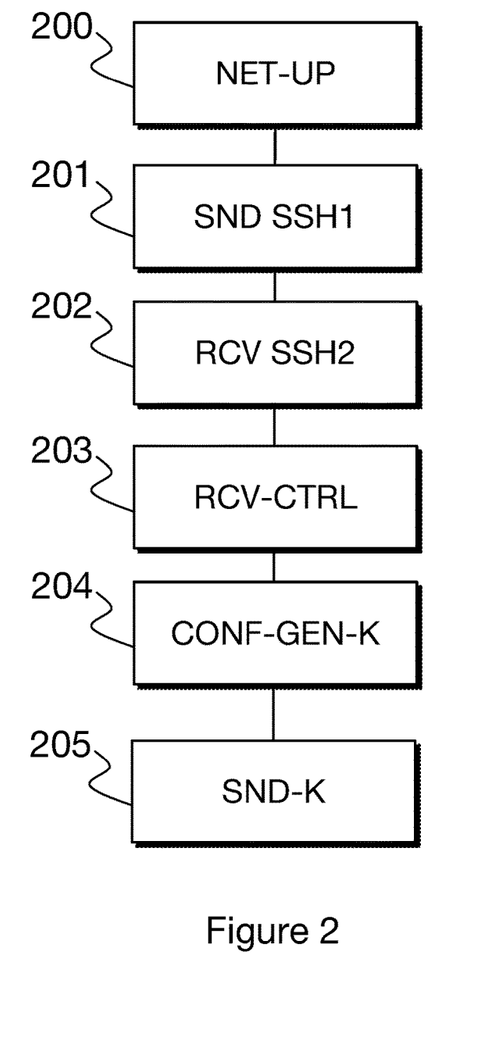
FIG. 2 illustrates the main steps of the method for receiving a configuration.
Figure 3:
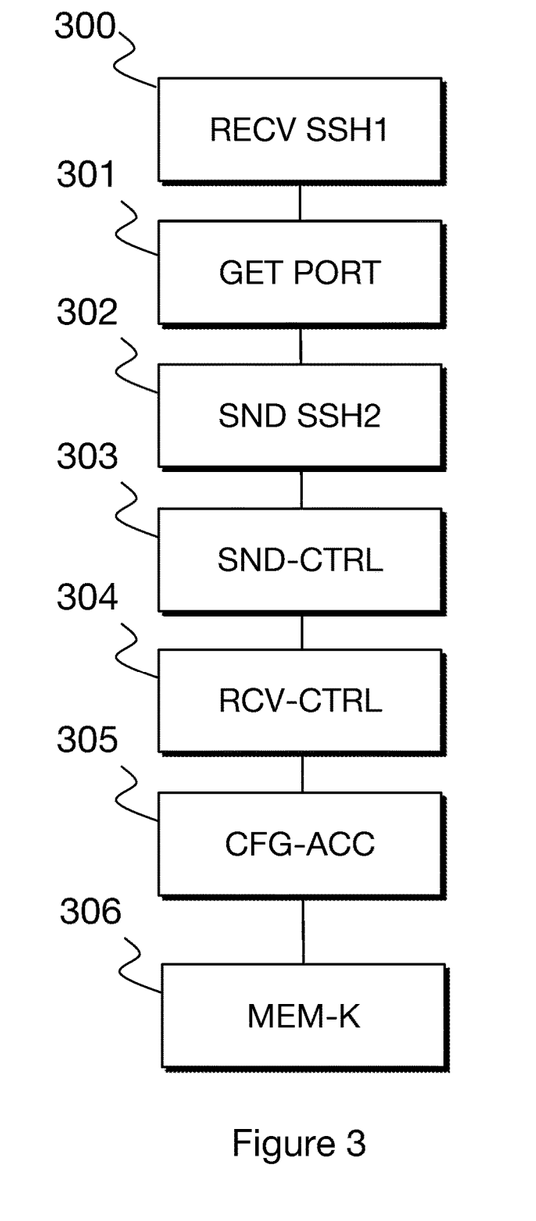
FIG. 3 illustrates the main steps of the method for distributing a configuration.

The steps of the configuration distribution and configuration methods will now be described with reference to FIGS. 1, 2 and 3.

In a first step 200, the probe 102 detects a network connection. The probe 102 is able to detect that a connection to a network is possible when it receives, by way of its network interface, an IP address and/or a default gateway address that are valid on the network 104.

When a valid connection is detected, the probe 102 consults its initial configuration in order to determine the address of the server 101. The configuration may be stored in a persistent memory of the probe, such as for example in a ROM (read-only memory), a flash memory or else a hard disk. The configuration data are stored for example in the form of a structured file or of a database. The address of the server is for example a URL (Uniform Resource Locator) or an IP address.

In step 201, the probe sends a secure connection establishment message SSH1 to the server 101. The message comprises in particular a user account identifier U2 on the server 101 and the associated public key KPU2. In this example, the user account ID1 is identical to the identifier of the probe 102. This connection is called a "carrier" connection.

According to one particular implementation, the user account identifier is derived from the identifier of the probe. For example, the user account identifier U2 may correspond to the identifier of the probe from which alphanumeric characters are removed or to which alphanumeric characters are added. For example, if the initial identifier of the probe 102 is "newprobe", the user account U2 on the server may be derived by concatenating 4 figures, so as to give for example "newprobe9990". In such a case, the figures that are added may correspond to a port number. This port number is for example a port number contained in the initial configuration of the probe, or a port number from a range of port numbers contained in the initial configuration of the probe 102.

The server 101 receives the connection request SSH1 in step 300. In step 300, the server 101 obtains the authorizations to access the user account U2 in accordance with the public key KPU2 received in the connection request and accepts the establishment of the connection if the authorizations are valid.

In step 301, the server derives a port number from the user account identifier to which the secure connection request refers. For example, if the user account U2 to which the connection request SSH refers is "newprobe9990", the server 101 derives the port number "9990" from the last 4 characters of the identifier.

In step 302, the server 101 listens to the port number derived in step 301 and sends a secure connection establishment request SSH2 "carried" by the "carrier" connection established in step 300. This connection request comprises a user account identifier U1 that is initially configured on the probe 102 and a public key KPU1 associated with this account on the probe. The account identifier U1 and the associated public key PKU1 are shared by all of the probes in their initial configuration and are provided in the server 101 by an initial configuration. The requested connection SSH2 is furthermore configured by the server such that the incoming connections on the port to which the server is listening (derived from the account identifier U2) are redirected to the "carried" connection.

Although the gateway protecting the network 104 prevents the incoming connections, the server 101 is able to establish a connection to the probe 102 through the carrier connection, because the "carrier" connection, through which the "carried" connection is established, has been established beforehand from the probe 102 to the server 101, that is to say in a direction authorized by the gateway.

Provided that the carrier and carried connections are established between the probe 102 and the server 101, an operator is able to access the probe 102 from the computer 109, without him being denied connection by a gateway at the entry of the network 104.

According to one particular implementation, the server 101 verifies, in step 301, that the derived port is not already configured so as to redirect the incoming connections to another probe currently being configured. For example, if the probe 103 attempts to connect to the server 101 when the probe 102 has already established a carrier connection with the server 101, the server denies the connection. The device 103 may attempt a new connection after a waiting time, for example after one minute, until the probe 102 has freed up the connection.

According to one particular embodiment, when the establishment of a carrier connection is denied by the server because the port derived from the user account identifier is already associated with another carrier connection for configuring another probe, that is to say because a probe is connected with its initial configuration, the probe 102 generates a new user account identifier U2 from a new port number selected from a range of ports contained in its initial configuration. For example, following the failure of a connection with a user account identifier "probe9990", a probe may attempt a new connection with an account identifier "probe9991".

The probe 102 receives the "carried" connection request sent by the server 101 in step 202. The probe 102 verifies the validity of the connection request on the basis of the public key KPU1 contained in the connection request and accepts the connection when the public key KPU1 authorizes the connection.

In step 303, the server 101 uses the carried connection to send a control message 301 to the probe 102. The control message comprises a code, for example. The code may be a sequence of figures and/or characters generated by the server. The code is generated by the server in such a way as to guarantee the uniqueness thereof. In this way, the server is not able to generate two identical codes. To this end, the code may for example comprise an element whose value is determined by a clock. The generated code is stored by the server in the database 108 in association with the identifier of the probe, the port number associated with the carried connection or with the identifier of the user account with which the probe has established the "carrier" connection.

In a step 203, the probe 102 receives the code that is generated and transmitted by the server via the "carried" connection and relays the received code to the server 101 in a confirmation message sent by a terminal known to the server 101 to be a trusted terminal.

In one particular implementation, the probe 102 transmits the code to the terminal 106 whose call identifier is stored in the database 108 of the server as being a trusted terminal. To transmit the code, the probe may display the code on a screen of the probe, for example in the form of a two-dimensional graphic code, such as a barcode or a QR code. Advantageously, the graphic code comprises, besides the code transmitted by the server, an address of the server 101 available in the initial configuration of the probe. The two-dimensional code may be configured so as to trigger a connection to the server 101 and pass the received code as a parameter. For example, the displayed graphic code corresponds to a URL of the type:

"http:/www.configserveur.com/confirm.html?code=123456"

The reading of the two-dimensional graphic code by the terminal 106 then brings about a connection to the server in order to transmit the code.

As a variant, the code may be displayed in alphanumeric form in order to be copied over to the terminal 106 by a user and transmitted to the server 101 through SMS (Short Message Service) or through voice communication with an interactive voice server via a DTMF sequence or vocally via an operator, or through any other means allowing the server to identify the message containing the code as originating from a trusted terminal.

The server receives the confirmation message comprising the code in step 304, during which the validity of the code and the identifier of the terminal sending the message are verified. The server obtains for example the identifier of the sender of the message in a header of the message. This may be a "from" field of an SIP (Session Initiation Protocol) message or a field of a signaling message containing an identifier of a calling terminal or else an email address of a sender when the code is transmitted by electronic mail.

When the code received by the server is valid and the sender of the message containing the code corresponds to a trusted terminal, the server 101 obtains the identifier of the probe for which the code has been generated. The identifier is obtained for example by a request to the database 108 in which the code was stored in association with the identifier of the probe in step 303.

In step 305, the server 101 generates a customized and unique identifier U3 for the probe 102 and transmits this identifier to the probe 102 by way of the "carried" connection. This identifier comprises in particular a port number that will be assigned to the probe 102 in its subsequent connections. For example, the server generates an identifier such as "probe6050", the last 4 figures corresponding to the port 6050 on the server, and creates a user account U3 whose identifier is the generated customized identifier.

The probe receives the customized identifier in step 204 and generates a pair of asymmetric keys comprising a private key KPR3 and a public key KPU3. The pair of asymmetric keys that is generated is stored in the configuration of the probe as a substitute for the identifier of the initial configuration and the keys KPR2 and KPU2. The generated public key is then transmitted to the server in a step 205.

In step 306, the server receives the public key KPU3 generated and transmitted by the probe 102 and stores it in association with the identifier of the probe generated in step 305, and configures access rights to the account U3 for the connections using the key KPU3.

According to one particular embodiment, the private key KPR3/public key KPU3 pair is generated by the server 101 and transmitted to the probe with its customized identifier in step 305. The server then deletes the private key of which only the probe 102 has use. Such a provision relieves the probe of the responsibility of creating the key pair.

In step 207, the probe terminates the "carrier" connection and the "carried" connection.

The probe 102 configuration has thus been able to be customized securely, without it being necessary for an operator to intervene physically on the probe.

Thereafter, when the probe 102 detects a network connection, it establishes a first "carrier" secure connection to the server 101 using its customized identifier U3 and the associated public key KPU3. On the establishment of this first connection, the server establishes a second "carried" secure connection by way of the first connection and listens to the port derived from the identifier U3 so as to redirect the connections arriving on this port to the carried connection so that they are able to reach the probe 102.

The method thus allows an operator to easily and securely access a probe installed in a private network protected by a firewall.

Although the above description has been given with reference to the configuration of a probe, the configuration and configuration distribution methods may apply to any type of device requiring its configuration to be customized. For example, the methods may apply to a connected object, a computer or else a router.

Likewise, even though the above description makes reference to secure connections of SSH type, the configuration and configuration distribution methods may use another type of secure configuration, such as for example SSL.

Figure 4:
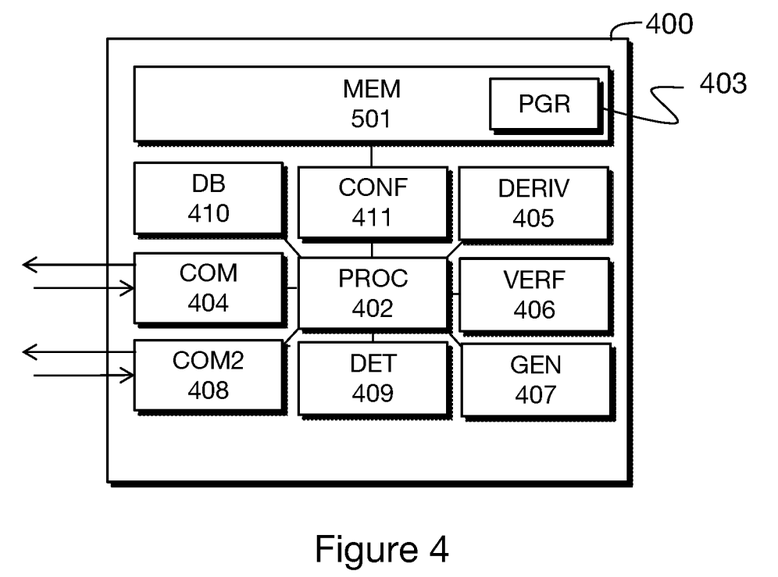
FIG. 4 shows the architecture of a device designed to implement the configuration method.

FIG. 4 illustrates the architecture of a device 400 designed to implement the method for distributing a configuration according to one particular embodiment of the invention.

The device 400 comprises a data processing module comprising a storage space 401, for example a memory (MEM), a processing unit 402, equipped for example with a microprocessor (PROC), and driven by the computer program (PGR) 403 implementing the distribution method as described above.

On initialization, the code instructions of the computer program 403 are for example loaded into memory, before being executed by the processor of the processing unit 402. The microprocessor of the processing unit 402, in accordance with the instructions of the computer program 403, implements the steps of the method for distributing a configuration, and in particular the steps of deriving a communication port number from an identifier of a first terminal received in a connection establishment message, of generating and storing an item of control data in association with the identifier of the terminal, of transmitting, via the established connection, a control message to the first terminal, the message comprising at least the generated item of control data, of receiving, from a second terminal, a confirmation message comprising said item of control data and an identifier of the second terminal, of determining that the identifier of the second terminal is an identifier of a trusted terminal, and when the second terminal is determined to be a trusted terminal, of configuring customized parameters for the first terminal to access the server and transmitting the customized parameters to the first terminal.

The device 400 furthermore comprises means 405 for deriving a communication port number from an identifier of the first terminal received in a message establishing the connection. Such means correspond for example to a memory comprising computer program instructions intended to be executed by a processing unit and configured so as to isolate, from an alphanumeric identifier of a terminal, characters corresponding to a port number.

The device 400 also comprises verification means 406 for verifying that the identifier of the first terminal is an identifier shared by a plurality of terminals. To this end, the device may comprise a memory in which there are recorded computer program instructions intended to be executed by a processing unit and configured so as to compare at least part of a received identifier of the terminal with a preconfigured value. For example, these verification means are configured so as to compare the received identifier of the terminal with a user name stored beforehand on the server, for example in a database 410.

The device 400 also comprises means 407 for generating and storing an item of control data in association with the identifier of the terminal. Such means are for example implemented by a pseudorandom generator configured so as to generate a sequence of alphanumeric characters. The means 400 furthermore comprise a memory, such as a flash memory, a magnetic disk, or a database 410, designed to persistently store the item of control data thus generated and an identifier of the associated terminal.

The device also comprises a communication module 404 (COM) allowing the device 400 to connect to a telecommunications network, for example an Ethernet or Wi-Fi network interface or else a 2G, 3G or 4G interface. The communication interface 404 is designed to establish communication with a terminal and transmit a control message comprising at least one item of control data generated by the module 407. According to one particular implementation, the communication module is designed to establish secure connections with a terminal, for example SSH communications.

The device 400 comprises a second communication module 408 designed to receive, from a second terminal, a confirmation message comprising an item of control data and an identifier of a second terminal. The module 408 corresponds for example to an Ethernet or Wi-Fi network interface or else a 2G, 3G or 4G interface.

The device 400 also comprises means 409 for determining that the identifier of the second terminal is an identifier of a trusted terminal. To this end, the device may comprise a memory in which there are recorded computer program instructions intended to be executed by a processing unit and configured so as to compare at least part of a identifier of the terminal received from the second terminal with a preconfigured value, for example a value stored in a database 410.

The device 400 lastly includes a configuration module 411 designed to determine customized parameters for the first terminal to access a server and transmit customized parameters to the first terminal, the configuration module being implemented when the second terminal is determined to be a trusted terminal. Such a configuration module is implemented for example by a computer program comprising instructions recorded in a memory, for example in the memory 401, and configured so as to generate a unique sequence of alphanumeric characters to which there is concatenated for example a communication port number selected by the server from a preconfigured range of communication port numbers that are no longer used to generate an identifier. The instructions are furthermore configured so as to transmit the identifier thus generated to the terminal.

According to one particular embodiment, the configuration module 411 is furthermore designed to generate an authentication key associated with the generated identifier, and configure access rights to the server that are associated with the authentication key. For example, the configuration module may comprise computer program instructions configured so as to execute an asymmetric key generation algorithm, store a public key in association with access rights and transmit the private key, the public key and the associated identifier to the terminal.

Figure 5:
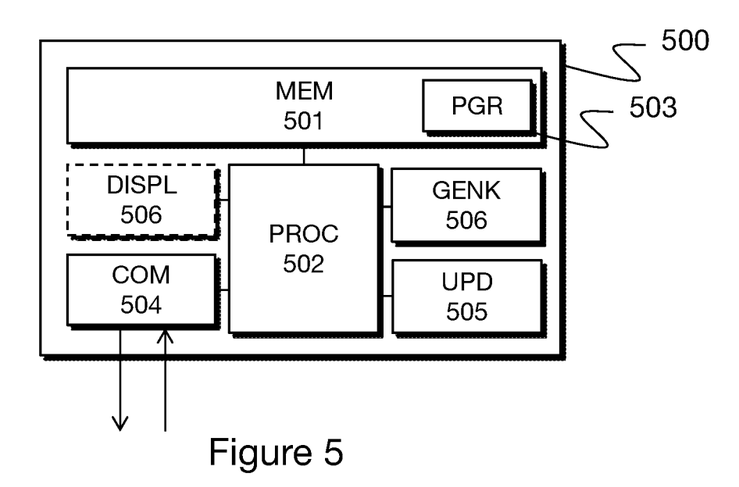
FIG. 5 shows the architecture of a device designed to implement the method for distributing a configuration.

FIG. 5 shows the architecture of a device 500 designed to implement the method for receiving a configuration according to one particular embodiment of the invention.

The device 500 comprises a data processing module comprising a storage space 501, for example a memory (MEM), a processing unit 502, equipped for example with a microprocessor (PROC), and driven by the computer program (PGR) 503 implementing the method for receiving a configuration as described above.

On initialization, the code instructions of the computer program 503 are for example loaded into memory, before being executed by the processor of the processing unit 502. The microprocessor of the processing unit 502, in accordance with the instructions of the computer program 503, implements the steps of the method for receiving a configuration, and in particular the steps of receiving, from a server, a control message comprising at least one item of control data generated by the server, of transmitting said item of control data to a second terminal, said second terminal being configured so as to transmit the item of control data and an identifier of the second terminal to the server by way of an access network different from the first communication network, and of receiving customized configuration parameters from the server, and configuring the terminal on the basis of the received parameters.

The device 500 comprises communication means 504 configured so as to transmit, in a connection establishment message, an identifier of the device comprising a communication port number contained in an initial configuration of the device. The communication means 504 correspond for example to an Ethernet, Wi-Fi, 2G, 3G or 4G network interface driven by instructions of a computer program recorded in a memory of the device, which instructions are executed by a processing unit. Such instructions are configured so as to obtain an initial identifier of the device and a communication port number, for example from a configuration file recorded in a persistent memory of the device such as a hard disk or a flash memory, so as to concatenate the identifier and the port number that are obtained so as to generate an identifier from which it is possible to derive the communication port number, and so as to transmit a message comprising the identifier thus formed to a server whose address is contained in the initial configuration file.

The communication means 504 are furthermore configured so as to receive, from the server, a control message comprising at least one item of control data generated by the server, so as to transmit said item of control data to a second terminal, said second terminal being configured so as to transmit the item of control data and an identifier of the second terminal to the server by way of an access network different from the first communication network, and so as to receive customized configuration parameters from the server.

The device 500 furthermore comprising means 505 for updating its configuration on the basis of the received parameters. These means for updating the configuration are for example implemented by computer program instructions recorded in a memory such as the memory 501 so as to be executed by a processing unit such as the processing unit 502 of the device. The instructions are for example configured so as to obtain a customized identifier of the device generated by the server, the identifier comprising a communication port number.

According to one particular implementation, the device 500 furthermore comprises means 506 for generating an authentication key. For example, the configuration means 506 correspond to computer program instructions intended to be executed by the processing unit 502 and configured so as to generate an authentication key, for example an RSA key pair, store the generated key or keys in a memory of the device, and transmit the generated public key to the server by way of the communication means 504 such that the server is able to associate particular access rights for the terminal.

According to one particular embodiment, the device 500 also comprises a display module 507, such as for example a screen designed to display information, and in particular to display an item of control data received from a server.

The invention claimed is:

1. A method for distributing, by way of a server, a configuration for a first terminal, the method comprising the following acts:
    establishing, on the initiative of said first terminal, a connection between said first terminal and the server, the connection being configured so as to redirect at least one connection request received by the server on a communication port to said first terminal, wherein the communication port is derived from an identifier of the first terminal that is received in a message establishing the connection;
    when the identifier of the first terminal is an identifier associated with a plurality of terminals:
        generating and storing an item of control data in association with the identifier of the first terminal,
        transmitting, via the established connection, a control message to the first terminal, the message comprising at least the generated item of control data,
        receiving, from a second terminal, a confirmation message comprising said item of control data and an identifier of the second terminal,
        determining that the identifier of the second terminal is an identifier of a trusted terminal; and
    when the second terminal is determined to be a trusted terminal:
        configuring customized parameters for the first terminal to access the server and transmitting the customized parameters to the first terminal.

2. The method according to claim 1, wherein the act of configuring and transmitting customized access parameters for the first terminal to access the server comprises the following sub-acts:
    obtaining a terminal identifier stored in association with the item of control data,
    generating and transmitting a second identifier to the first terminal corresponding to the obtained identifier, the second identifier comprising a communication port number different from the communication port number derived from the first identifier,
    receiving, from the first terminal, an authentication key generated by the first terminal in response to the reception of the second identifier, and
    associating said received public key with at least authorization to access the server.

3. The method according to claim 1, wherein the establishment, on the initiative of the first terminal, of a connection between the first terminal and the server comprises the following acts:
    receiving a command to establish a first secure connection originating from the first terminal, the command comprising an identifier of the first terminal,
    deriving a communication port number from the received identifier of the first terminal,
    establishing a second secure connection between the server and the first terminal through the first connection and configured so as to redirect incoming connections on said derived communication port number to the first terminal.

4. The method according to claim 1, such that the establishment of a connection originating from the first terminal is denied when a connection is already established with a terminal having the same terminal identifier as the first terminal.

5. A method for receiving, by way of a first terminal, a configuration distributed by a server, said first terminal being connected to a first communication network, the method comprising the following acts:
    establishing, on the initiative of said first terminal, a first connection between the first terminal and the server, the said first connection being configured so as to establish a second connection through said first connection from the server to said first terminal;
    said terminal transmitting in a message establishing the first connection an identifier of said first terminal comprising a communication port number; and
    when the identifier of said first terminal is an identifier associated with a plurality of terminals:
        receiving, from the server via the second connection, a control message comprising at least one item of control data generated by the server,
        transmitting said item of control data to a second terminal,
        receiving via the second connection a second identifier of the first terminal from the server,
        generating at least one authentication key associated with the second identifier,
        transmitting via the second connection said at least one generated key to the server, and
        storing the second identifier of the first terminal and said at least one generated authentication key.

6. The method according to claim 5, wherein the act of establishing a the first connection between the first terminal and the server comprises the following sub-acts:
    sending a command to establish a first secure connection to the server, the command comprising a first identifier of the first terminal obtained from an initial configuration of the first terminal, the first identifier of the device first terminal comprising a port number, and
    receiving, through said first secured connection established with the server, a command to establish a second secure connection.

7. The method according to claim 5, wherein the method furthermore comprises, upon detection of a denial to establish the first connection, triggering a countdown timer at the expiry of which a new connection attempt is made.

8. The method according to claim 7, wherein the new connection attempt comprises transmitting a connection establishment message comprising an identifier of the first terminal, the identifier comprising a port number different from the port number contained in the first identifier of the first terminal.

9. The method according to claim 5, wherein the act of transmitting the item of control data to the second terminal different from the first terminal, comprises displaying the item of control data on a screen of the first terminal.

10. A device for distributing a configuration to at least a first terminal, the device comprising:
    a processor; and
    a non-transitory computer-readable medium comprising instructions stored thereon, which when executed by the processor configure the device to:
        establish a connection with a first terminal on the initiative of said first terminal, the connection being configured so as to redirect connection requests received by the device on a communication port to the first terminal, derive a number of said communication port from an identifier of the first terminal received in a message establishing the connection, verify that the identifier of the first terminal is an identifier associated with a plurality of terminals, generate and store an item of control data in association with the identifier of the terminal, transmit, via the established connection, a control message to the first terminal, the message comprising at least the generated item of control data, receive, from a second terminal, a confirmation message comprising said item of control data and an identifier of the second terminal, determine that the identifier of the second terminal is an identifier of a trusted terminal, and when the second terminal is determined to be a trusted terminal:

configure customized parameters for the first terminal to access the server and transmit customized parameters to the first terminal.

11. A device able to be configured by a server, the device being connectable to a first communication network and comprising:

a processor; and a non-transitory computer-readable medium comprising instructions stored thereon, which when executed by the processor configure the device to:

establish a first connection to the server, said first connection being configured so as to establish a second connection through the said first connection, from the server to the device, transmit, in a message establishing the first connection, an identifier of the device comprising a communication port number, receive, from the server via the second connection, a control message comprising at least one item of control data generated by the server, transmit said item of control data to a second terminal, receive via the second connection a second identifier of the device from the server, generate at least one authentication key associated with the second identifier, transmit via the second connection said at least one generated key to the server, and store the second identifier of the device and said at least one generated authentication key.

12. The device according to claim 10, wherein the device is implemented by the server.

13. The device according to claim 11, wherein the device is implemented by a first terminal.

14. A non-transitory computer-readable medium on which there is recorded a computer program comprising instructions for executing a method for distributing, by way of a server, a configuration for a first terminal, when the instructions are executed by a processor of the server, wherein the instructions configure the server to:

establish, on the initiative of said first terminal, a connection between said first terminal and the server, the connection being configured so as to redirect at least one connection request received by the server on a communication port to said first terminal, wherein the communication port is derived from an identifier of the first terminal that is received in a message establishing the connection;

when the identifier of the first terminal is an identifier associated with a plurality of terminals:

generate and store an item of control data in association with the identifier of the first terminal, transmit, via the established connection, a control message to the first terminal, the message comprising at least the generated item of control data, receive, from a second terminal, a confirmation message comprising said item of control data and an identifier of the second terminal, determine that the identifier of the second terminal is an identifier of a trusted terminal; and when the second terminal is determined to be a trusted terminal:

configure customized parameters for the first terminal to access the server and transmit the customized parameters to the first terminal.

* * * * *